United States Patent [19]
Wheeler

[11] 4,084,996
[45] Apr. 18, 1978

[54] METHOD OF MAKING A GROOVED, FIBER-CLAD PLYWOOD PANEL

[75] Inventor: Robert G. Wheeler, Corvallis, Oreg.

[73] Assignee: Wood Processes, Oregon Ltd., Corvallis, Oreg.

[21] Appl. No.: 675,552

[22] Filed: Apr. 9, 1976

Related U.S. Application Data

[63] Continuation-in-part of Ser. No. 488,274, Jul. 15, 1974, abandoned.

[51] Int. Cl.² .......................... B27D 1/08; B32B 31/20
[52] U.S. Cl. ............................... 156/257; 144/314 B; 144/317; 156/62.2; 156/214; 156/220; 156/228; 264/119; 264/293; 428/167; 428/170; 428/171; 428/326
[58] Field of Search ............... 156/219, 220, 211, 212, 156/214, 62.2, 581, 257, 228; 144/309 D, 310 B, 313, 314 R, 314 A, 314 B, 315 R, 317, 320 R, 328; 264/119, 293; 76/107 R; 428/167, 168, 170, 171, 326

[56] References Cited
U.S. PATENT DOCUMENTS

| | | | |
|---|---|---|---|
| 1,755,038 | 4/1930 | Tition | 76/107 R |
| 2,046,000 | 6/1936 | Sart | 264/293 |
| 2,992,152 | 7/1961 | Chapman | 264/113 X |
| 3,492,194 | 1/1970 | Rauch | 156/219 |
| 3,639,200 | 2/1972 | Elmendorf et al. | 156/62.2 X |
| 3,661,688 | 5/1972 | Wheeler | 156/220 X |
| 3,669,783 | 6/1972 | Wheeler | 156/90 |
| 3,748,222 | 7/1973 | Wheeler | 162/165 |
| 3,868,300 | 2/1975 | Wheeler | 156/212 X |
| 3,869,326 | 3/1975 | Matzke | 156/219 X |

*Primary Examiner*—David Klein
*Assistant Examiner*—M. G. Wityshyn
*Attorney, Agent, or Firm*—Klarquist, Sparkman, Campbell, Leigh, Hall & Whinston

[57] ABSTRACT

A plywood panel is provided with a durable and highly weather-proof surface and a plurality of embossed parallel grooves therein for enhancing its appearance. A metal caul plate is formed with the series of spaced apart ridges corresponding to desired grooves in the panel. A moist, spongy fibrous web is placed between the surface of the plywood panel and the surface of the caul plate, with an adhesive coating on either the panel or on the web surface facing the panel. The assembly of the caul plate and the plywood panel with the web therebetween is inserted into a hot press and subjected to heat and pressure and the web is firmly adhesively secured to the panel. The web, as well as the adhesive used for securing the web onto the panel, contains a quantity of thermo-setting phenolic resin so that the covered surface of the panel is durable and highly weather-proof. The original plywood panel may be of low quality and grade, having surface defects and blemishes, all of which are concealed by the covering web.

13 Claims, 12 Drawing Figures

METHOD OF MAKING A GROOVED, FIBER-CLAD PLYWOOD PANEL

CROSS-REFERENCE TO RELATED APPLICATION

This application is a continuation-in-part of my application Ser. No. 488,274, filed July 15, 1974, entitled METHOD OF MAKING A GROOVED, FIBER-CLAD PLYWOOD PANEL, and now abandoned.

BACKGROUND OF THE INVENTION

Top grade plywood panels suitable for exterior usage are becoming increasingly scarce and expensive so that it is desirable to convert low-quality plywood panels into higher quality products suitable for external uses. Fiber-clad plywood panels having the purpose of upgrading lowquality panels are disclosed in my prior U.S. Pat No. 3,669,783, issued Mar. 13, 1972, which relates to a method for forming a flat-surfaced plywood panel with a printed paper surface and intended for decorative interior usage.

My prior U.S. Pat. No. 3,661,688, dated May 9, 1972, relates to a grooved panel but the core consists entirely of wood shavings or the like in which grooves are formed. While the particle board, as disclosed in the last mentioned patent, has met with considerable commercial success, much is left to be desired because such a particle board paneling lacks the structural strength of a plywood panel of comparable thickness.

SUMMARY OF THE INVENTION

In accordance with the present invention, a plywood panel is covered with a damp cellulosic fibrous web with a suitable phenolic type adhesive between panel and web and a metal caul plate is employed in adhering the fibrous web to the plywood panel. The caul plate is provided on the surface facing the panel and interposed web with a series of spaced apart ridges adapted to form parallel grooves in the surface of the finished product. The assembly of caul plate, web and panel are brought together in a hot press where the assembly is subjected to heat and pressure and the web is firmly adhesively secured to the panel, while the caul plate ridges establish parallel grooves in the finished panel. The web as well as the adhesive contain thermo-setting phenolic components so that when the assembly is placed under pressure and heat, the web is converted into a dense overlay on the panel which is durable and weather-proof. The panel may be of low quality and grade and any surface defects or blemishes on the surface thereof are concealed, thereby converting the panel into a high-quality product.

In one embodiment according to the present invention, a preformed plywood panel is first provided on one surface with a series of spaced apart, machine cut parallel grooves simulating, for example, grooved building siding. These grooves are juxtaposed with respect to the ridges on the caul plate but are somewhat smaller so that when the caul plate and the assembly of the panel and the web are brought together, the caul plate ridges form matching grooves, deforming the plywood while applying the web thereto. The caul plate ridges are preferably beveled at the edges thereof and the beveled edges are roughened so that when the caul plate and panel are brought together with the web therebetween and pressure applied thereto, the roughened edges will engage the corresponding adjacent portions of the moist and spongy web and will stretch and compress such portions against walls of the panel grooves without shearing the web over such areas. Deep embossing is possible in this manner.

According to another embodiment of the present invention, rather than providing the panel with preformed grooves, these grooves are completely formed by the caul plate ridges themselves as the caul plate is compressed into the assembly of panel and web in a hot press, the caul plate ridges becoming embedded in the plywood assembly. Furthermore, the panel need not be preformed, but rather, the plywood panel is formed from composite veneer layers at the same time and in the same press as employed to apply the fibrous web to the plywood. The moisture in the web is primarily relied upon to bring about the deformation of the plywood plies into a grooved appearance, together with subsequent drying which results in a permanently embossed and weather-proofed surface.

According to another embodiment, the plywood is first covered with a wood chip overlay before application of the fibrous web and caul plate under heat and pressure conditions. Ridges on the caul plate are able to bring about deep embossing on the product, providing the panel with an advantageously finished appearance. The product has the strength of plywood but the plywood itself may be of poor grade utilizing poor face veneers with uneven surfaces or the like.

It is accordingly an object of the present invention to provide a new and improved method for making a fiber-clad, grooved, plywood panel, particularly suitable for upgrading low grade wooden panels and the like.

It is a further object of the present invention to provide a new and improved method for making a fiber-clad, grooved, plywood panel, particularly suitable for exterior uses in which all the outwardly facing surfaces of the panel, including the sidewalls of the grooves, are covered with a dense, weather-protective skin of fibrous material tightly bonded thereto.

It is a further object of the present invention to provide a new and improved method for making a fiber-clad, grooved, plywood panel, providing the same with a dense overlay either during or subsequent to the formation of the plywood panel.

It is another object of the present invention to provide a new and improved caul plate for use in manufacture of a fiber-clad, grooved, plywood panel.

It is another object of the present invention to provide a new and improved method for making a fiber-clad, grooved, plywood panel wherein the grooves are deeply embossed, and wherein the panel retains the strength of plywood.

It is a further object of the present invention to provide a new and improved method for making a fiber-clad, grooved, plywood panel having an enhanced decorative appearance which may be formed from relatively poor grade plywood including poor or uneven face veneers.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
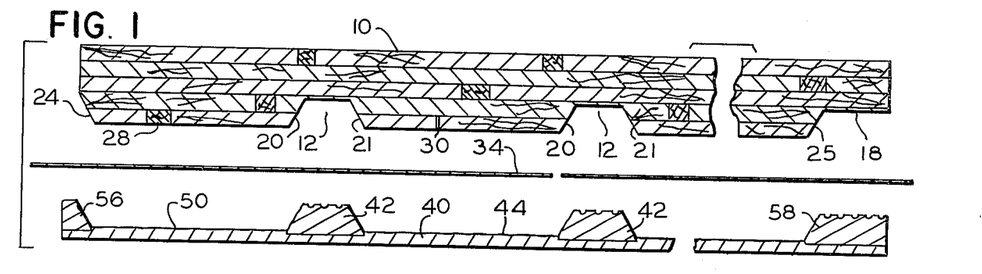
FIG. 1 is a partially broken away cross-sectional view of an assembly of elements in exploded form for forming a grooved panel according to a first embodiment of the method of the present invention.

In accordance with the present invention, and as shown in FIG. 1 of the drawings, a preformed plywood panel 10, sanded or unsanded, is first provided with a series of relatively deep machine cut grooves 12 which are spaced apart a desired distance and extend in parallel relation lengthwise of the panel 10. Assuming that the normal thickness of the panel is five-eighths of an inch thick, the depth of the grooves 12 will be of the order of one-fourth inch, although it is to be understood that this relative relationship of the depth of the grooves 12 to the thickness of the plywood panel may be varied as desired. The panel in this instance, although not necessarily limited thereto, is ultimately provided along its opposite side edges with cut away portions facing in opposite directions so that when a plurality of similar panels are assembled together into a wall, the opposite edge portions will overlap in a manner illustrated in FIG. 4 which will be later referred to.

Attention is directed to the fact that the side walls 20 and 21 of the grooves 12 are angularly inclined inwardly toward each other at the bottom of the grooves, the angle of the inclination being of the order of five to twenty degrees relative to the perpendicular from the flat surface of the panel 10. Similarly, the side walls 24 ans 25 at the opposite edge portions of the panel are also inclined at a comparable angle relative to the perpendicular as described with relation to the side walls of the grooves 12.

The preformed panel, although not necessarily so, is illustrated as being of five ply thickness and is also of low quality containing knots or other blemishes 28 or cracks 30. Any open knots must first be filled with a suitable waterproof filler.

For covering the grooved surface of the panel I utilize a moist spongy cellulosic fibrous web 34. A web formed on a suction cylinder from waste newsprint is quite suitable. One example of such a web is described in my prior U.S. Pat. No. 3,748,222, dated July 24, 1973, entitled PROCESS FOR MAKING A FIBER OVERLAY WEB FOR A COMPOSITE BOARD. This web is particularly suitable for use in this instance because it contains a quantity of phenolic resin and when cured in a hot press forms a durable and highly weather resistant overlay. As indicated in that patent the moisture content of the web is suitably about sixty percent of the total weight of the web, although it may have a moisture content from about fifty to about seventy percent of the total weight of the web.

The surface of the web 34 facing the panel 10 may be covered with an adhesive layer which is preferably of a phenolic type. It may be in powdered form or applied in liquid form to the surface of the web 34 and then partially dried with infrared heat at least sufficiently to remove its tackiness.

Instead of applying the adhesive layer onto the web, the plywood panels may be airless spray coated with phenolic resin adhesive and then the resin coating predried in an infra-red oven. Care must be taken so as not to preadvance the resin but only to evaporate the water until the coating is not tacky. The panels may then be stacked without danger of sticking together.

For compressing the damp web 34 against the grooved surfaces of the panel 10, I employ a metal caul plate 40 which is provided with a plurality of ridge forming elements 42 suitably secured thereto. The elements 42 are spaced apart the same distance as the grooves 12 formed in the surface of the panel and that portion of the elements 42 which project from the surface 44 of the plate 40 form the dimensions of the grooves 12 in the final product. The grooves 12 as machine cut in the panel before the application of damp web 34 and the caul plate are approximately one-thirty-second to one-sixteenth inch smaller in width and depth dimensions than element 42, whereby adequate compression of the web into and against the grooves will take place to form the protective covering and obtain a sufficient bond. Not only is the web compressed, but also the layers of plywood veneer thereunder receive permanent deformation because of lignin flow and rearrangement of wood particles due principally to moisture in the web forming steam with heat and pressure.

Figure 3:
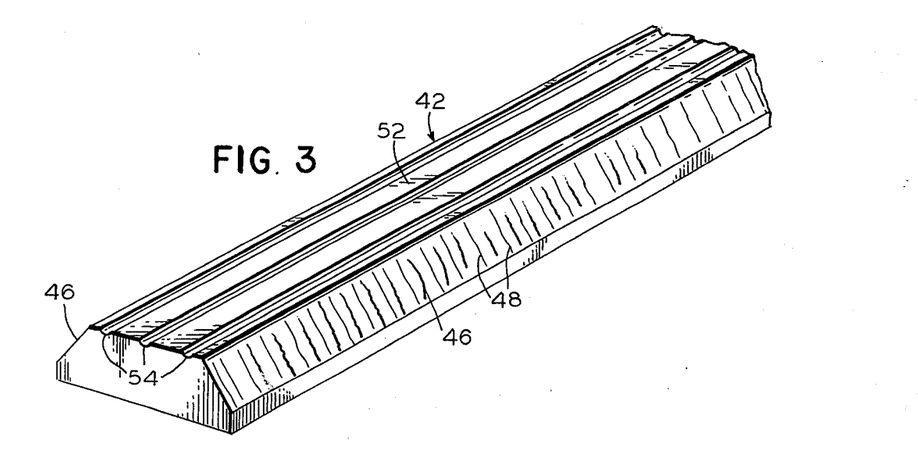
FIG. 3 is a fragmentary view to an enlarged scale of an element employed for providing the ridges embodied in the caul plate included in the view of FIG. 1.

A fragmentary view to an enlarged scale of a portion of one of the elements 42 is illustrated in FIG. 3. Particular attention is directed to the fact that the beveled edge surfaces 46 are roughened along their entire length as indicated by the striations 48. The surface areas 50 between the ridge forming elements 42 of the caul plate 40 are preferably provided with a rough, jagged, textured surface design, as disclosed in my design U.S. patent Des. No. 213,493, dated Mar. 11, 1969. This design is produced by a machining process disclosed in my U.S. Pat. No. 3,474,706 dated Oct. 28, 1969, and entitled PROCESS FOR MAKING A TEXTURED SURFACE PANEL. Substantially the same process as disclosed in the last mentioned patent may be employed for roughening the beveled surfaces 46 of the ridge forming elements 42. The surface of elements 42, as viewed in FIG. 1 and shown in FIG. 3 at 52, may be provided, if desired, with a plurality of relatively shallow grooves 54 for forming a series of small beads in the bottom of the panel grooves. Provided at the opposite longitudinal edges of the caul plate are longitudinal strips 56 and 58 for compressing the web over the edge portions 24 and 25 respectively while additionally the strip 58 compresses the web 34 against the shoulder 18 of panel 10.

Figure 2:
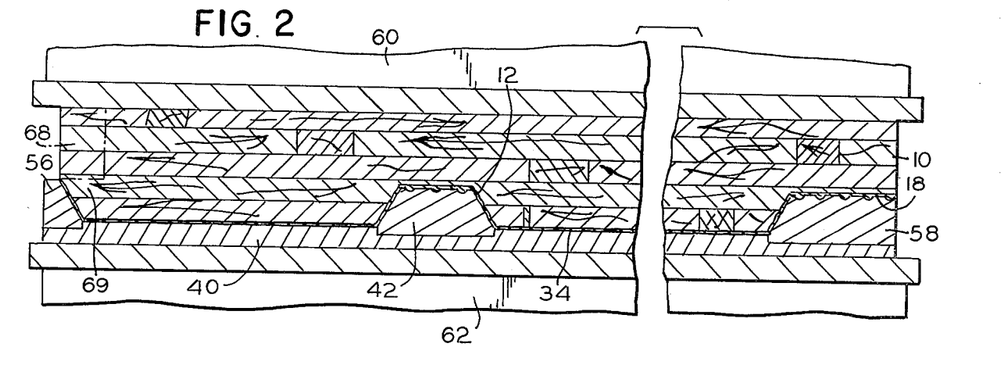
FIG. 2 is a cross-sectional view, partially broken away, of the same elements compacted together in a hot press.

Referring now to FIG. 2, the panel 10 is shown loaded into a hot press including an upper platen unit 60 and a lower platen unit 62, the panel being shown supported upon caul plate 40. If desired, the caul plate may be placed on top of the upturned panel 10. The caul plate 40 is assembled with the ridge forming elements 42 fitting into the grooves 12 of the panel 10. The damp web 34 is compressed against the facing surface of the panel 10. The partially dried precoating of adhesive on either the damp web or on the panel will polymerize under heat and pressure and firmly bond the web onto the panel. Due to the angularly sloping relationship of the side walls 20 and 21 of the grooves 12 and the corresponding matching beveled edge portions 46 of the elements 42 and, furthermore, due to the roughened nature of the beveled surfaces 46, the web on account of its damp spongy nature will be stretched and carried to the bottoms of the grooves 12 without shearing or tearing the web 34. The web will remain continuous across the entire width of the panel and all edge surfaces of the panel will be fully protected against weather.

Figure 4:
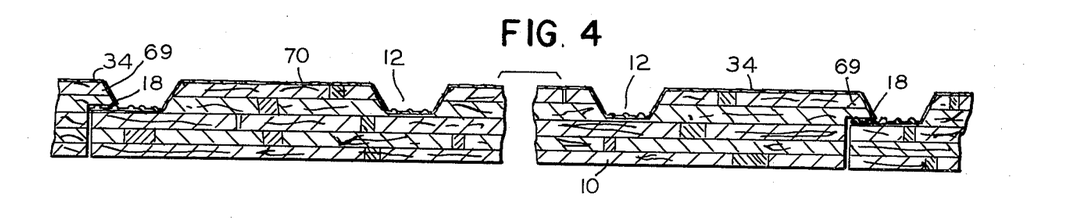
FIG. 4 is a cross-sectional view of a wall employing panel products constructed in accordance with the present invention.

In FIG. 4 is shown a wall of a plurality of similar panels in an overlapping or ship-lap edge to edge relation. After the panel is removed from the press, and during the normal trimming of the panel, the edge portion 68 marked by dotted lines at the left edge in FIG. 2 is cut away leaving a shoulder 69 for overlapping the oppositely facing shoulder 18 on the next adjacent panel. The surface areas 70 of the panel between the grooves 12 will be provided with a textured pattern as shown in my above mentioned design U.S. Pat. No. 213,493. Moreover, if desired, the outer surface of the skins 34 covering the panel may be coated with a desired color which may be applied to the web prior to the assembly of the web into the press as described in my prior U.S. Pat. No. 3,748,222 referred to above.

Through the utilization of a web 34, as described in my U.S. Pat. No. 3,748,222, no sticking of the caul plate 40 to the adjacent surface of the cured panel will occur and the caul plate will separate freely from the cured panel notwithstanding the textured surface 44 of the caul plate 40 and notwithstanding the pressure of the ridge forming elements 42 and edge strips 56 and 58. The press is suitably operated at a pressure of about 100 to 200 p.s.i., at about 275° to 350° F, for 6 to 15 minutes.

The method according to a second embodiment of the present invention is illustrated in FIGS. 5–8. According to this method, the plywood panel need not be pregrooved, but rather plywood veneers of the panel are compressed into a grooved configuration at the same time the fibrous web 34 is applied to the panel. Moreover, the plywood panel need not be preformed, but the fibrous web can be applied to the panel at the same time the panel itself is being formed and in the same press used for consolidating the veneer plies into an integral panel.

Figure 5:
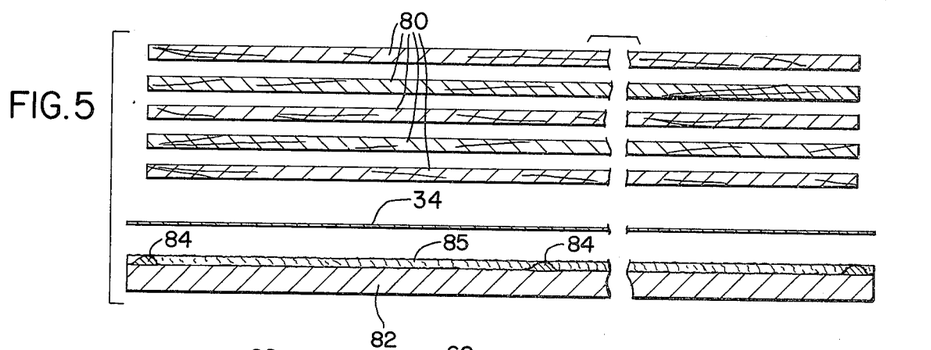
FIG. 5 is a partially broken away cross-sectional view of an assembly of elements in exploded form for forming a grooved panel according to a second method embodiment of the present invention.

Referring to FIG. 5, the components to be compressed are illustrated in exploded form including veneer plies 80 which may contain knots, blemishes or cracks, and a juxtaposed, moist, spongy, cellulosic, fibrous web 34 of the type hereinbefore described. The surface of the web 34 facing the panel plies may be covered with an adhesive layer as in the previous embodiment, or alternatively, the adjacent ply may be sprayed with a phenolic resin or the like as previously mentioned. For compressing the web 34 against the plywood, a metal caul plate 82 is utilized which is provided with a plurality of ridge forming elements 84 secured thereto. The elements 84 are suitably parallel and are spaced apart the desired distance for forming corresponding grooves in the lower surface of the completed panel.

Figure 7:
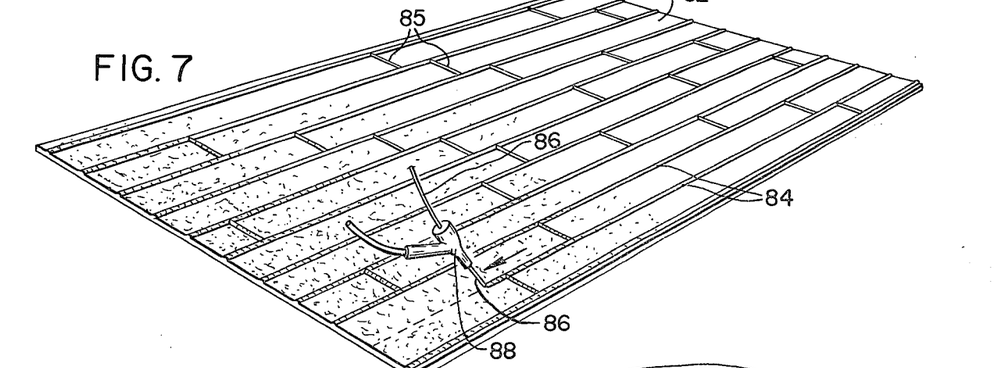
FIG. 7 is a perspective view of a caul plate employed according to the method embodiment of FIGS. 5 and 6.

The caul plate 82 is further illustrated in FIG. 7. The upper surface of the caul plate is desirably roughened or provided with a rough, jagged, textured surface design as disclosed in my Des. U.S. Pat. No. 213,493 produced by the machining process disclosed in my U.S. Pat. No. 3,474,706 mentioned above. The caul plate is further provided on its upper surface with the plurality of spaced, substantially parallel ridge forming elements 84, said ridge forming elements comprising weld beads about one-eighth inch high with converging, roughsurfaced, opposite side walls. As illustrated in FIG. 7, the welding rod 86 forming the bead is applied to the upper surface of the caul plate by means of a conventional electric welding device 88. The device 88 is moved in the direction of the arrow while welding rod 86 is fed thereto from a roll to form the bead. The bead thus substantially comprises welding rod with the bead suitably standing approximately one-eighth inch high above the general surface of the caul plate 82. The converging rough-surfaced opposite side walls formed during the application of the bead will supply a textured appearance to the grooves formed therewith in the finished panel product. The beads 84 are applied in straight, substantially parallel lines to the caul plate surface, while perpendicular beads 85, joining beads 84, may be similarly applied at selected locations for, completing a desired pattern.

Figure 6:
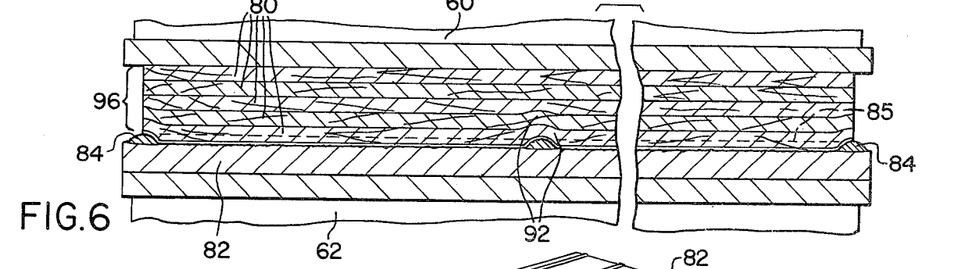
FIG. 6 is a cross-sectional view, partially broken away of the same elements as FIG. 5 compacted together in a hot press.

Referring now to FIG. 6, the plies 80 together with the web 34 are shown loaded into a hot press comprising platen units 60 and 62 as in the previous embodiment. The hot press is suitably of the type employed in forming the plywood panel itself in adhering together the plies thereof. The damp web 34 is compressed against the facing surface of the stacked plywood veneer and a partially dried pre-coating of adhesive on either the damp web or on the veneer will polymerize under heat and pressure and firmly bond the web onto the panel. During operation of the press, the ridges 84 become embedded in the plywood assembly as illustrated, thus compressing and deforming the plywood veneer layers as indicated at 92. The high moisture content of the web causes steam to be formed in the press softening the wood material and causing the lignin in the wood material to flow so the wood components become compressed and rearranged. The deformation is rendered permanent as the moisture is driven from the assembly in the hot press. That is, the grooves 94 in the finished panel assembly (illustrated in FIG. 8) are permanent and do not spring back after removal from the press. The process is suitably carried on at approximately 300° F at 200 pounds per square inch for about six to fifteen minutes. In general, it is satisfactory to employ the same pressure, temperature and time factors as would be required for forming the plywood panel alone. The veneer layers, precoated with adhesive, are bonded together.

Figure 8:
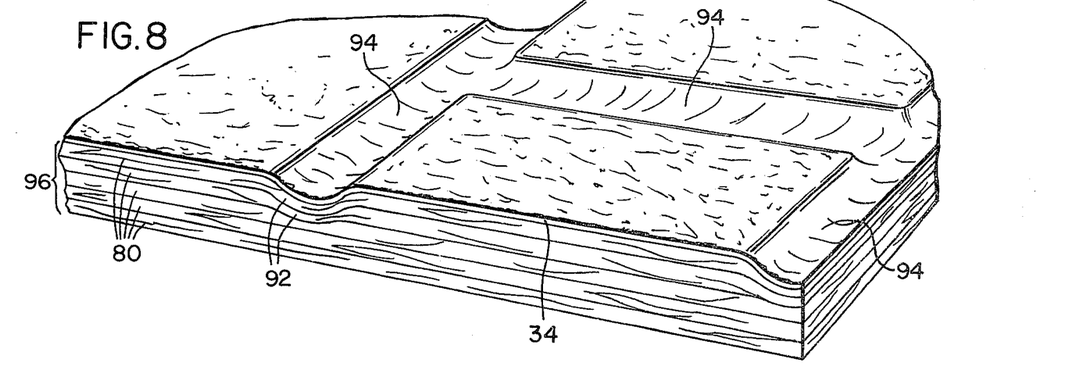
FIG. 8 is a perspective view, partially broken away, of a section of wallpaneling constructed in accordance with the second method embodiment of the present invention.

The completed plywood panel 96 is illustrated in FIG. 8 which shows the compressed and textured web 34 including grooves 94 embossed into the surface of the web and into the veneer plies therebeneath. The rough-surfaced side walls of the weld bead ridges 84 function in a manner similar to that described with respect to ridge forming elements 42 in the first embodiment. Thus, due to the rough surfaces, the web on account of its damp spongy nature will be stretched and carried to the bottoms of the grooves 94 without shearing or tearing of the web. The web will remain continuous across the entire width of the panel and all surfaces of the panel will be fully protected against weather.

While the embodiment of FIGS. 5-8 has been described with respect to applying the protective and decorative coating and manufacturing the grooved panel in one step, starting from the component veneer plies, it is also possible to manufacture the product starting from a preformed plywood panel. Thus, the panel 96 in FIG. 6 would be juxtaposed with respect to caul plate 82 having ridges 84, and with the fibrous web 84 located therebetween. In this instance, the preformed panel is depressed against the web covered caul plate for a period of six to fifteen minutes at a pressure of from 100 to 200 pounds per square inch and at a temperature from 300-350° F. These figures must be adjusted for various thicknesses and moisture contents of the web. In the case of either the preformed plywood panel or the plywood panel which is formed concurrently with the application of the web, a poorer grade panel is transformed into an attractive grooved product which is fully covered and protected.

According to the embodiment of FIGS. 9-12, a plywood panel 98, which may be of poor grade, is first covered with a continuous layer of wood chips 100, at least to a depth comparable to one of the plywood plies, before application of the fibrous web 34 of the type hereinbefore described, and the ridge forming caul plate. In this manner, deep embossing is facilitated, and the plywood panel is not pregrooved as in the first embodiment. The wood chip overlay particles mask imperfections, voids, etc. as may appear in the surface veneer of the plywood panel, resulting in a deeply grooved product of excellent appearance but which retains the strength of the plywood panel for constructional purposes and the like. The wood chip overlay also allows more latitude in regard to the area or extent of the panel which can be grooved.

The wood chip particles (layer 100) may comprise wood waste materials such as planer shavings, veneer flakes, or the like, and are mixed with a suitable adhesive such as phenolic resin. The wood particles are then dried, e.g., to have a moisture content of about eight to thirteen percent. The wood particles may be deposited to a depth of approximately one-half to one inch for subsequently resulting in a layer 102 (in FIG. 11), of about one-fourth to three-eighths of an inch. The adhesive used with the particles must be one which sets or cures after having been subjected to heat and pressure in the presence of steam, and must be one which will not be excessively absorbed into the wood particles. In compressing the web 34 against the wood chip layer 100 and plywood panel 98, a metal caul plate 102 is employed which is provided with a plurality of ridge forming elements 104 attached thereto and spaced apart the distance desired for parallel grooves 106 in the finished panel. (See FIG. 12.) Assuming the total height of layer 102 in FIG. 11 is approximately three-eighths of an inch, then the height of ridge forming elements 104 of the surface of the caul plate 102 is approximately three-sixteenths to one-fourth of an inch.

Figure 9:
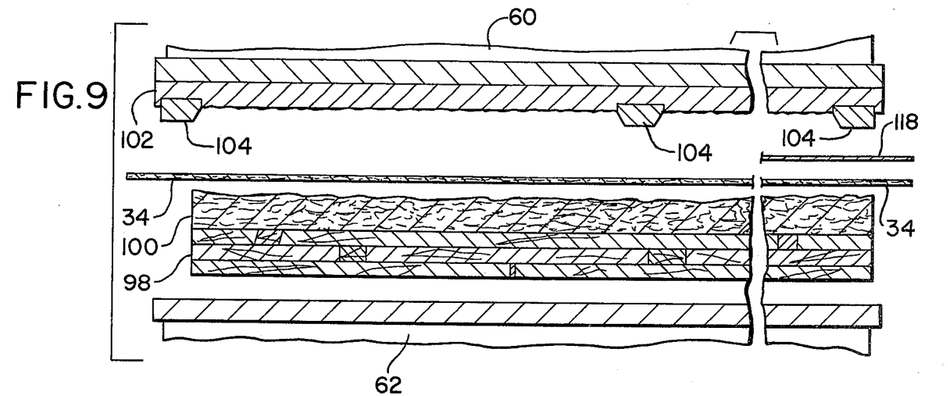
FIG. 9 is a partially broken away cross-sectional view of assembly elements in exploded form for forming a grooved panel according to further embodiments of the present invention.
Figure 10:
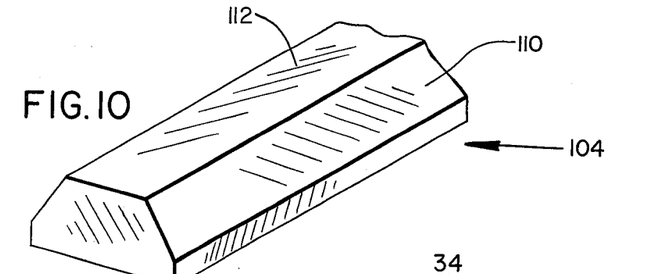
FIG. 10 is a fragmentary view of an element employed for providing the ridges embodied in the caul plate included in the view of FIG. 9.
Figure 11:
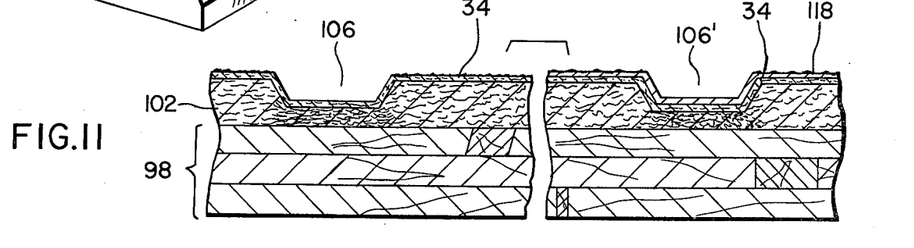
FIG. 11 is a cross-sectional view, partially broken away, of the elements of FIG. 9 compacted together to form a panel product.
Figure 12:
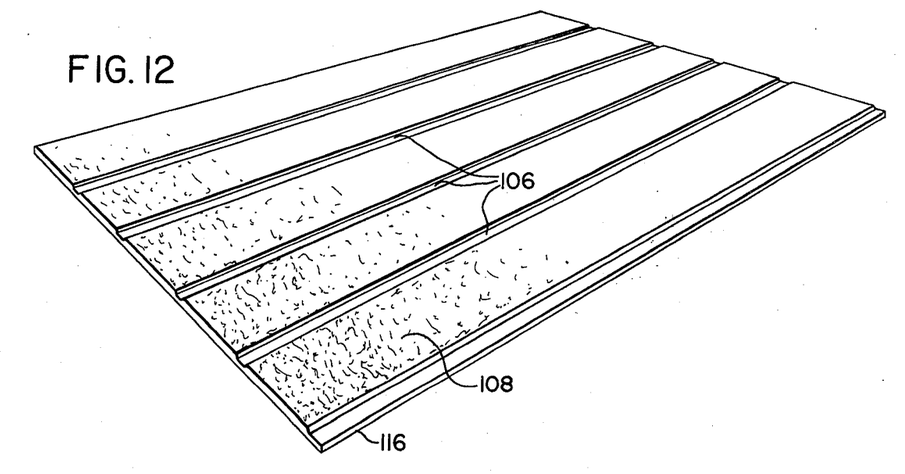
FIG. 12 is a perspective view of a panel product constructed in accordance with the method illustrated in FIGS. 9–11.

In the instance of the method embodiment of FIGS. 9-12, the caul plate 102 is suitably attached to upper platen unit 60 so as to be juxtaposed above the wood chip layer 100 when the assembly of the plywood panel, wood chip layer and fibrous web are disposed between the press platens as illustrated in the exploded view of FIG. 9. FIG. 10 is a fragmentary view of one of the ridge forming elements 104. The surface of the caul plate between the ridge forming elements 104 is suitably provided with a textured surface design, as hereinbefore described, so as to texture the surface 108 of the finished panel in FIG. 12. The beveled surfaces 110 and upper surface 112 of the ridge forming elements 104 may be similarly roughened to provide a textured surface on the finished product. As herein-before mentioned, this surface roughness assists in carrying the fibrous web into the grooves 106 in the finished product. With the panel 98 carrying wood chip layer 100 disposed in a hot press between platen units 60 and 62, and with fibrous web 34 interposed between a caul plate 102 carried by platen unit 60 and the wood chip layer, the press is operated for consolidating the wood chip layer into an approximately three-eighths inch thickness while forming grooves 106 in such layer and pressing fibrous web 34 into such grooves to complete the grooved surfaces. As before, the web is suitably precoated with an adhesive which will polymerize under heat and pressure to bond the web firmly onto the wood chip layer 102. The wood chip layer is consolidated at the same time and adhered to the panel 98 therebelow which is also suitably supplied on its upper surface with a precoating of adhesive. The hot press in this embodiment is suitably operated at a temperature between 275° and 350° F, and at a pressure from 75 to 200 pounds per square inch for a period of about 15 minutes, depending upon moisture content and the like. The plies of panel 98 may be secured together at the same time if so desired rather than the panel being preformed. The panel product of FIG. 12 is suitably lapped in the same manner as illustrated in FIG. 4. Thus, the panel is formed with a shoulder 116 on one edge.

A variation of the present embodiment is illustrated at the right hand side of FIG. 9 and FIG. 11 and includes the interposition of a decorative pattern sheet 118 in between the caul plate and the fibrous web during the forming operation of the panel product. Decorative pattern sheet 118 may, for example, be provided with a pattern simulating high-grade wood surfacing, or may be of a selected color. The pattern sheet is either supplied on the rear side thereof (next to web 34) with a glue coating, or alternatively the upper surface of the web 34 or the rear surface of the pattern sheet 118 may be coated with a phenolic resin or the like. The ridge forming elements 104 then carry the decorative pattern sheet 118 as well as the web 34 into the wood chip layer 100 for surfacing the grooves 106' as well as the remainder of the panel surface with the decorative pattern. The decorative pattern will also be embossed by the irregular surface of the caul plate between the ridge forming elements 104.

Because of the deep embossing involved, the decorative pattern sheet is desirably formed of creped paper. For instance, a sheet 118 may be a cross-creped kraft known as X-Crepe manufactured by Cincinnati Industries, Inc., Cincinnati, Ohio. A desired pattern may be printed thereupon. The use of a decorative pattern sheet is not restricted to the embodiment of FIGS. 9–12, but likewise may be employed over the fibrous web 34 if desired in either of the previous embodiments.

In the embodiment of FIGS. 9–12, as in the previous embodiments, the final product takes a final set in the press and does not spring back. A press temperature in excess of about 260° F is required in order to assure this set so the product won't spring back when it becomes wet. In the embodiment of FIGS. 9–12, the wood chip layer entirely conceals poor grade plywood surfaces, concealing knots, cracks, etc. in one step without requiring other filler, while providing a deep-grooved contoured surface having a textured appearance, transforming the poor grade plywood panel into an attractive and sturdy product.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. The method of making a plywood panel having a grooved, fiber-clad surface including the steps:
    forming a caul plate with a plurality of parallel ridges about one-eighth inch high with converging, rough-surfaced opposite side walls.
    forming a spongy, cellulosic pulp web having a moisture content of from fifty to seventy percent of the total weight of the web,
    juxtapositioning said web and a plywood assembly,
    assembling said caul plate and said plywood assembly with the ridged surface of said caul plate next adjacent to said web in a hot press,
    and compressing said caul plate under heat against said web and plywood assembly to cause said ridges to become releasably embedded in said plywood assembly penetrating below the surface level thereof for providing grooves therein while carrying said web into said grooves, resulting in permanent deformation in said plywood assembly by movement of wood components therein under heat, pressure and moisture conditions as provided.

2. The method of making a plywood panel having a grooved, fiber-clad surface including the steps:
    rough machining a metal caul plate so as to produce a rough, jagged, textured surface on the upper side of said plate,
    forming a plurality of parallel ridges comprising weld beads on said upper surface of said caul plate about one-eighth inch high with converging, rough-surfaced opposite said walls adjacent said upper side of said plate,
    vacuum-forming a spongy, cellulosic, fibrous, pulp web from a slurry of cellulosic fibrous pulp and including a thermo-setting resinous material,
    juxtapositioning said web and a plywood assembly,
    assembling said caul plate and said web and the plywood assembly with said ridged surface of the caul plate next adjacent said web,
    and compressing said caul plate in a hot press under sufficient heat and pressure against said web and plywood assembly to cause steam to be formed due to the moisture from said web for softening the layer of plywood assembly next adjacent said web whereby said ridges and the jagged textured surface of said caul plate will emboss a complementary surface pattern on the outer surface of said web, with said ridges becoming releasably embedded in said plywood assembly, and will securely bond said web and the plywood assembly together.

3. The method of making a plywood panel having a grooved fiber clad surface including the steps:
    adhesively adhering a spongy cellulosic fibrous web upon one surface of a plywood panel, wherein said fibrous web has a high moisture content as compared with said panel,
    forming a caul plate with spaced apart ridges projecting from the surface of such plate and with side edges of said ridges roughened for frictionally engaging said web, and
    compressing said web under heat and pressure against said panel with said caul plate including frictionally engaging portions of said web by the roughened sides of said ridges and stretching said portions of said web to carry the same into grooves in said plywood panel without tearing of said web for converting said web into a non-ruptured, dense overlay.

4. The method according to claim 3 including providing said web with thermo-setting resin component material so that when said web is compressed under heat and pressure against said panel, the said web is converted into a durable and weatherproof overlay.

5. The method according to claim 3 in which the areas of said caul plate between said ridges are roughened with a textured pattern whereby during said compressing operation a textured pattern is produced on the corresponding areas of said plywood panel.

6. The method according to claim 3 wherein the layer of said panel adjacent said web comprises a continuous layer of wood chips, together with a bonding additive, disposed upon and covering the remaining layers of said panel to a depth at least comparable to the thickness of each of the remaining layers, wherein said heat and pressure acts to consolidate said wood chips into a compressed and integral layer, securing the same to the veneer plies thereunder, while shaping said grooves therein and carrying said web into said grooves to provide a surface therefor.

7. The method according to claim 3 further including disposing a pattern sheet between said caul plate and said web for adherence to said web, said pattern sheet being formed of creped paper.

8. The method according to claim 3 wherein said panel comprises veneer plies adjacent said web wherein said veneer plies are consolidated into a plywood panel at the same time said web is applied thereto,
    said ridges of said caul plate acting to form the grooves completely in said panel by the heat and pressure, said pressure causing said ridges to become releasably embedded in said panel penetrating below the surface level thereof adjacent said web.

9. The method according to claim 3 wherein said panel comprises a preformed plywood panel,
said ridges of said caul plate acting to form the grooves completely in said panel by heat and pressure,
said pressure causing said ridges to become releasably embedded in said panel penetrating below the surface level thereof adjacent said web.

10. The method of making a plywood panel having a grooved, fiber-clad surface including the steps:
forming relatively wide and deep, spaced apart, parallel grooves in one surface of a preformed plywood panel,
forming a caul plate with spaced apart ridges projecting from the surface of said caul plate, said ridges being located for alignment with the parallel grooves in said one surface of said preformed plywood panel, said ridges being generally complementary to said grooves in said one surface of said preformed plywood panel, but being larger in width and depth than said parallel grooves in said plywood panel,
forming a spongy, cellulosic, fibrous, pulp web from a slurry of cellulosic, fibrous pulp, said web having a moisture content of from fifty to seventy percent, and including a thermo-setting resinous material,
juxtaposing said web and said plywood panel with said web being disposed over said one surface of said plywood panel,
assembling said caul plate and the assembly of the plywood panel and web in a hot press with the ridged surface of said caul plate next adjacent said web and with said ridge in alignment with said parallel grooves,
and compressing said caul plate in said hot press against said web and plywood panel including bringing said ridges of said caul plate to bear into said parallel grooves under sufficient heat and pressure to cause steam to be formed due to the moisture from said web for softening the layer of the plywood panel next adjacent said web and producing a permanent deformation in at least said next adjacent layer by permanent movement of wooden components thereof enlarging said grooves and compressing said web between said ridges and said grooves for thorough bonding of said web into said grooves, said web being compressed against said panel by said caul plate to form a continuous protective coating over said panel, said moisture being driven out by said heat and pressure,
wherein the side edges of said ridges of said caul plate are roughened so as to frictionally engage and stretch corresponding portions of said web and carry the same into said grooves for compression thereof without tearing of said web for causing said web to provide a non-ruptured dense overlay.

11. The method according to claim 10 in which the opposite side edges of said preformed plywood panel are formed with marginal edge portions of reduced thickness which face oppositely with respect to an inner ply of said panel and wherein the side walls of said portions adjacent said one surface slope slightly outwardly of said panel and said caul plate is also formed with complementary edge portions having slightly sloping side edges for compressing and adhering the edge portions of said web over the side edge portions of the plywood panel at said marginal edge portions.

12. The method according to claim 10 in which the areas of said caul plate between said ridges are roughened with a textured pattern whereby during the compressing operation a textured pattern is produced on the corresponding areas of the plywood panel.

13. The method according to claim 10 wherein said ridges of said caul plate are provided with beveled side edges wherein said beveled side edges of a given ridge slope toward each other in a direction away from said caul plate.

* * * * *

UNITED STATES PATENT AND TRADEMARK OFFICE
CERTIFICATE OF CORRECTION

PATENT NO. : 4,084,996
DATED : April 18, 1978
INVENTOR(S) : ROBERT G. WHEELER

It is certified that error appears in the above-identified patent and that said Letters Patent are hereby corrected as shown below:

Column 1, line 18, "lowquality" should be --low-quality--.

Column 3, line 68, "ans" should be --and--.

Column 6, line 44, delete the ",".

Column 8, line 24, "herein-before" should be --hereinbefore--.

Column 9, line 63, claim 2, "said", first occurrence, should be --side--.

Signed and Sealed this

Fifth Day of December 1978

[SEAL]

Attest:

RUTH C. MASON
Attesting Officer

DONALD W. BANNER
Commissioner of Patents and Trademarks